United States Patent Office 3,280,128
Patented Oct. 18, 1966

3,280,128
SILVER AND MERCURY DIPYRIDINE
COMPOUNDS
Hugh T. Harrison, Tulsa, Okla., assignor to The Dow
Chemical Company, Midland, Mich., a corporation of
Delaware
No Drawing. Filed Oct. 1, 1965, Ser. No. 492,277
5 Claims. (Cl. 260—270)

The present invention is concerned with organic chemistory and is directed to a dipyridine compound of the formula:

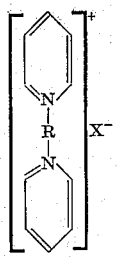

In the above and succeeding formulae, R represents a member selected from the group consisting of mercury and silver, and X represents a member selected from the group consisting of hexafluoroarsenate ($-AsF_6^-$) and hexafluorophosphate ($-PF_6^-$). The products of the present invention are crystalline solid materials. They are useful as parasiticides and are adapted to be employed in the control of insects, nematodes, helminths, and mites; they are also effective for the control of undesirable aquatic animal organisms. In addition, they can be employed as herbicides for the control of aquatic and terrestrial weeds.

The products of the present invention are prepared by the reaction of pyridine, a compound of the formula $RNO_3$ (or its hydrate), and a compound of the formula QX, wherein the symbol Q represents ammonium, sodium, or potassium. Conveniently, the reaction is carried out in water as a reaction medium. The reaction consumes the reactants in amounts which represent two molecular proportions of pyridine, one molecular proportion of $RNO_3$ reactant, and one molecular proportion of QX reactant. However, it is generally preferred to employ the pyridine reactant in an amount in excess of that consumed in the reaction, such as an amount representing from two to ten molecular proportions. Such use of excess pyridine assures that the dipyridine metal anion

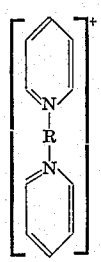

formed upon reaction of pyridine and the $RNO_3$ reactant will remain in solution for subsequent reaction with the QX reactant. The reaction is exothermic and takes place smoothly at temperatures of from 5 to 95° C., and conveniently at room temperature, with the production in the reaction mixture of the desired product and of by-product of the formula $QNO_3$.

In carrying out the reaction, the pyridine is successively contacted with the $RNO_3$ reactant and the QX reactant. Conveniently, the contacting is carried out by adding the pyridine to the $RNO_3$ reactant in water as reaction medium, and thereafter adding the QX reactant. The temperature of the reaction mixture can be controlled throughout by regulating the rate of contacting of the reactants as well as by external cooling. Sometimes the desired product precipitates in the reaction mixture during the reaction; if desirable to maintain fluid condition, such precipitated product can be separated in part from fluid portions of the mixture by conventional procedures, typically filtration. Upon completion of the contacting of the reactants, most of the reaction will have taken place; however, where optimum yields are desired, it is often preferred that the reaction mixture be allowed to stand for a period of time to complete the reaction. Upon completion of the reaction, the product compound is separated from the reaction mixture by filtration, and traces of solvent removed from the separated product by evaporation under subatmospheric pressure. If desired, the product can be purified by conventional procedures, such as washing with water or suitable organic liquid, or recrystallization.

The following examples set forth the best mode known by the inventor for carrying out the invention, and will enable those skilled in the art to practice the present invention.

EXAMPLE 1

Dipyridine silver hexafluoroarsenate

Silver nitrate (17 grams; 0.1 mole) was dispersed in 70 milliliters of distilled water, and 50 milliliters of pyridine (0.62 mole) were added at room temperature to the resulting dispersion over a period of 15 minutes to form a first mixture. A second mixture was prepared by dispersing 35 grams of potassium hexafluoroarsenate (0.15 mole) in 300 milliliters of distilled water at a temperature of 65° C. and over a period of 15 minutes. Thereafter, the first mixture was added to the second mixture, with the immediate precipitation in the resulting reaction mixture of the dipyridine silver hexafluoroarsenate product. The reaction mixture was stirred for 5 minutes, and then permitted to cool to a temperature of about 35° C. The product was separated from the cooled reaction mixture by filtration on a polyethylene filter funnel, and the separated product purified by washing successively with four 50 milliliter portions of water at a temperature of about 0° C. The purified product was dried by evaporation of any residual amounts of solvent under subatmospheric pressure. It is a white crystalline product melting, with decomposition, at 173°–176° C.

In a similar manner, there was prepared dipyridine silver hexafluorophosphate, a white crystalline solid melting at 174°–179° C.

EXAMPLE 2

Dipyridine mercury hexafluorophosphate

Mercurous nitrate monohydrate (28 grams; 0.1 mole) was dispersed in 150 milliliters of distilled water, and to the resulting dispersion added 75 milliliters of pyridine (0.93 mole) to form a first mixture. A second mixture was prepared by dispersing 28 grams of potassium hexafluorophosphate (0.15 mole) in 200 milliliters of warm distilled water. The first mixture was filtered, and the filtrate added to the second mixture, to form a reaction mixture. The solid residue obtained by filtration of the first mixture was washed, first with a mixture of 25 milliliters of pyridine and 25 milliliters of distilled water, and secondly with 25 milliliters of water. Both wash solutions were added to the reaction mixture. The reaction mixture was permitted to stand for a period of time and was thereafter filtered to separate the dipyridine mercury hexafluorophosphate product as a residue. The product residue was subjected to evaporation under subatmospheric pressure to remove any residual amounts of solvent. The dipyridine mercury hexafluorophosphate product is a crystalline solid which decomposes, without melting, at 290°–300° C.

In a similar manner, there is prepared dipyridine mercury hexafluoroarsenate product having a molecular weight of 547.7 and partially decomposing, without melting, at 300° C.

When a product of the present invention is employed as a parasiticide, the unmodified compound can be used. However, the present invention also encompasses the use of such compound together with a parasiticide adjuvant. In such use, the compound can be dispersed upon a finely divided solid and the resulting preparation employed as a dust. Also, such a mixture can be dispersed in water with the aid of a wetting agent and the resulting aqueous suspension employed as a spray. In other procedures, a product of the present invention can be employed as a constituent of an organic liquid composition, oil-in-water or water-in-oil emulsion, or water dispersion with or without the addition of wetting, dispersing, or emulsifying agent.

The compounds of the present invention are useful for the control of Daphnia in regulated bodies of water where their presence, particularly in large numbers, is detrimental. In representative operations, there was prepared an aqueous medium containing two parts of dipyridine silver hexafluorophosphate per million parts by weight of ultimate aqueous medium. Immediately after the preparation of the aqueous medium, a known number of Daphnia organisms was placed therein and the aqueous medium maintained under conditions conducive to the well-being of Daphnia for a period of twenty-four hours. Thereupon, the aqueous medium was examined, and it was found that there was a 100 percent kill of Daphnia.

I claim:
1. Compound of the formula

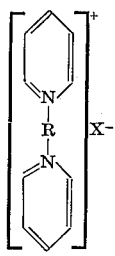

wherein R represents a member selected from the group consisting of silver and mercury and X represents a member selected from the group consisting of hexafluoroarsenate and hexafluorophosphate.

2. Product of claim 1 wherein R represents mercury and X represents hexafluoroarsenate.

3. Product of claim 1 wherein R represents mercury and X represents hexafluorophosphate.

4. Product of claim 1 wherein R represents silver and X represents hexafluoroarsenate.

5. Product of claim 1 wherein R represents silver and X represents hexafluorophosphate.

References Cited by the Examiner

UNITED STATES PATENTS

| | | | |
|---|---|---|---|
| 2,876,226 | 3/1959 | Schaeffer | 260—270 |
| 3,049,547 | 8/1962 | Cislak | 260—294.8 |
| 3,122,552 | 2/1964 | Harrison | 260—271 |
| 3,189,428 | 6/1965 | Mussell | 71—2.2 |

ALEX MAZEL, *Primary Examiner.*

HENRY R. JILES, *Examiner.*

DONALD G. DAUS, *Assistant Examiner.*